Oct. 18, 1955 — M. LENOIR — 2,720,915
TIRE FITTING AND REMOVING MACHINE
Filed March 17, 1953 — 3 Sheets-Sheet 1

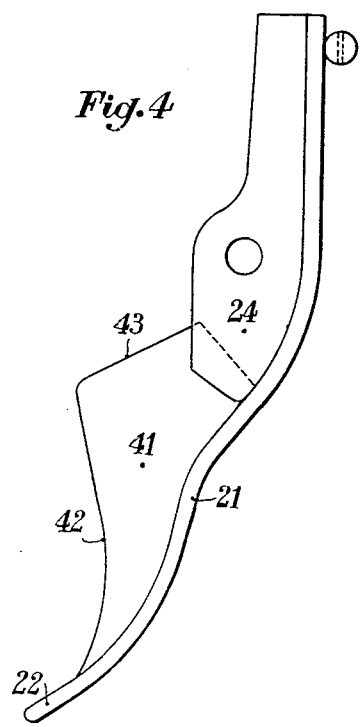
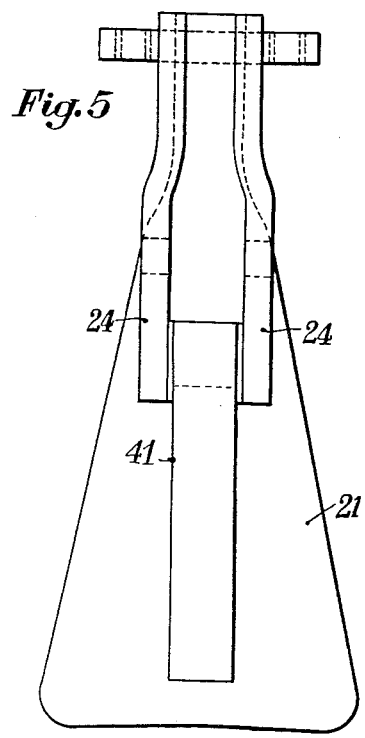
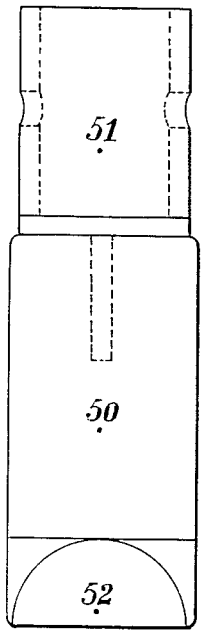
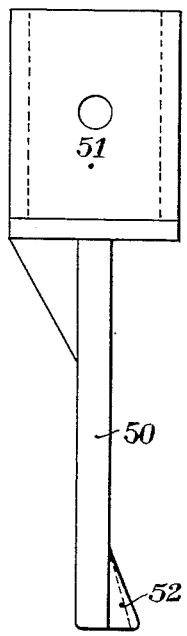
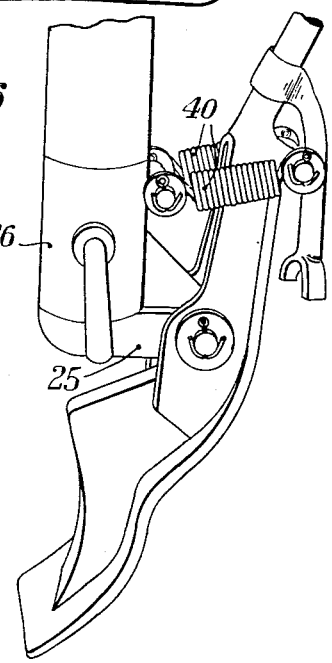

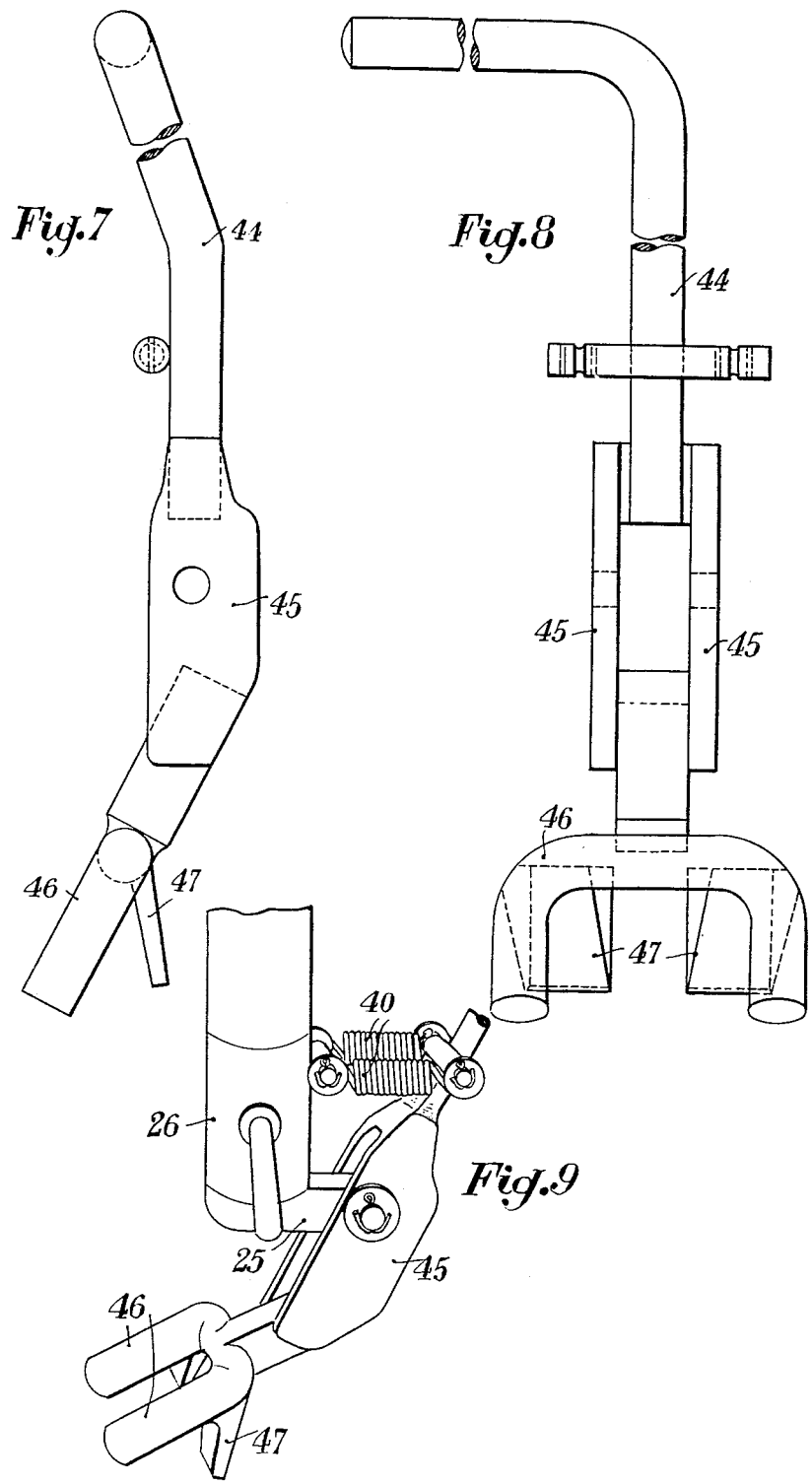

United States Patent Office 2,720,915
Patented Oct. 18, 1955

2,720,915

TIRE FITTING AND REMOVING MACHINE

Marcel Lenoir, Chateau-Thierry, France

Application March 17, 1953, Serial No. 342,908

Claims priority, application France March 25, 1952

1 Claim. (Cl. 157—1.17)

My invention is concerned with a tire fitting and removing machine which is comprised primarily of:

(a) A fixed upright in which an adjustable horizontal cantilever beam is slidably mounted;

(b) A compressed air or pressure liquid cylinder carried by said beam and having a piston slidably received therein which carries the tools;

(c) A set of removable tools to be attached to the piston rod;

(d) A rotatable and removable stand for the wheel to be fitted with a tire or stripped therefrom.

A preferred embodiment of my invention will be described hereinafter and is illustrated in the appended drawings for the mere purpose of exemplification. In the drawings:

Figure 4 shows in side elevational view a further embodiment of a similar tool.

Figure 5 is a front view of the same.

Figure 6 is a perspective view of the same tool as mounted on the end of the piston rod.

Figure 7 is a side elevational view, and

Figure 8 a front elevational view of a fork shaped tool for use in fitting and removing lock rings and wheel sections.

Figure 9 illustrates the same tool in working position.

Figures 10 and 11 illustrate a flat iron tool for use in locking ring removal.

Figure 1:
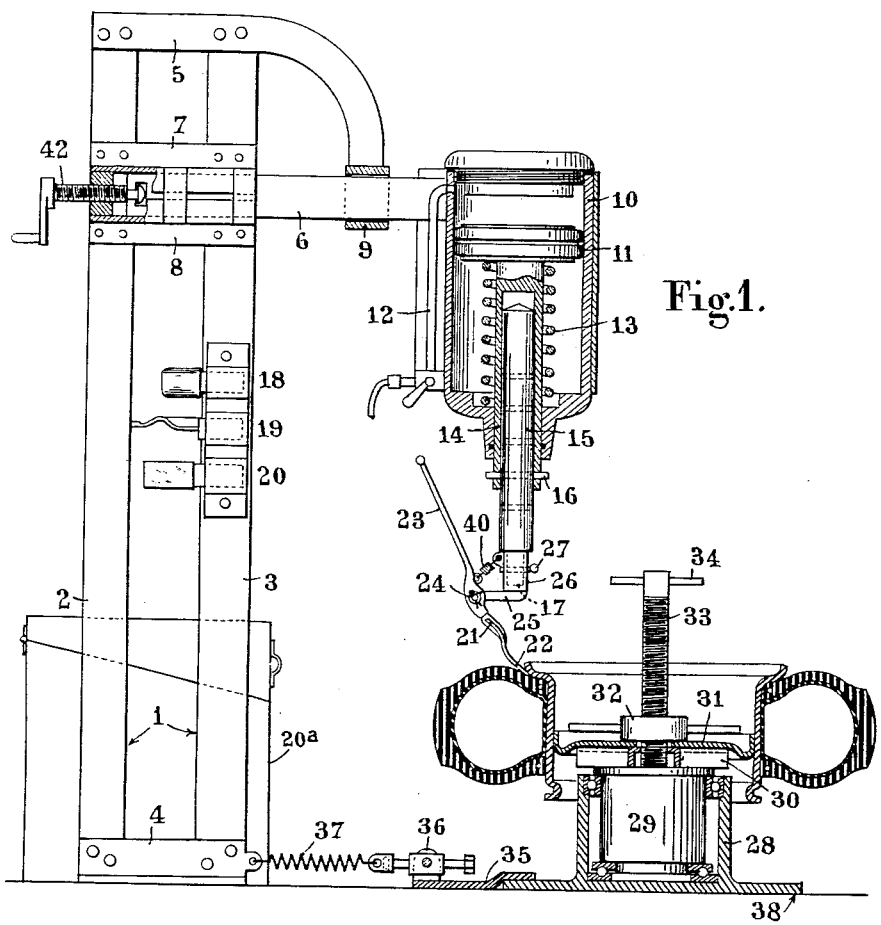
Figure 1 is a general elevational view of the machine, parts of it being shown in section.

As shown in Fig. 1, 1 designates an upright which is firmly anchored in the ground and which includes a pair of iron posts 2, 3 cross-braced to each other as shown at 4 and 5.

Guided at 7 and 8 for horizontal movement relative to the upright thus composed is a horizontal beam 6 which preferably is additionally supported close to its end by a further guide 9 on an extension of the cross-brace 5.

Secured to the free end of said beam 6 is a vertical cylinder 10 in which a piston 11 is slidably received which can be forced downwards by means of a fluid fed under a pressure into the space above the piston through a pipe 12, and this, against the counteraction of a spring 13 rested on the bottom of said cylinder 10.

The piston rod 14 is bored with an axial guide for a cylindrical shaft 15 which can be rigidly connected with the piston rod 14 by means of a cotter pin 16.

The shaft 15 extends at its lower end in a portion 17 of reduced diameter on which can be slipped such tools as are necessary in mounting and dismounting a tire, e. g. in removing locking rings, rim sections, and so on. Said tools may be arranged in a rack within the operator's reach as shown at 18, 19, 20, while those of rather large size, e. g. those which are illustrated in Figs. 3, 6 and 9, may be enclosed in a chest 20a secured to the upright.

Figure 3:
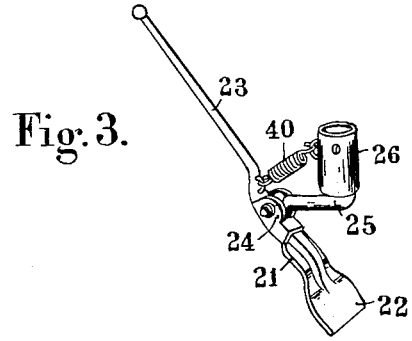
Figure 3 shows in perspective view a first embodiment of a spade-shaped tool for use in unsticking a tire from its wheel rim and forcing it away from the same.

In removing a tire a spade-shaped tool shown in Fig. 3 is used which comprises a flattened portion 22 emerging in spoon-like fashion with an offset portion 21 which is secured to a handle 23 and is provided at its junction therewith with a pair of bent-up lugs 24 through which projects a pin by means of which the whole tool is swingably connected to the end of an arm 25 formed with a socket 26.

Figure 2:
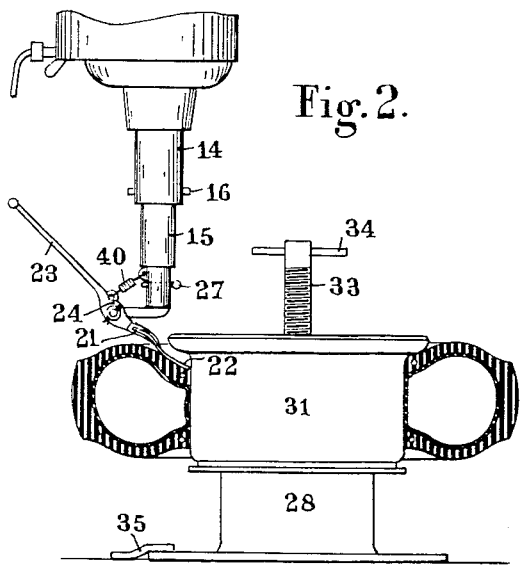
Figure 2 is a detail view illustrating the removal of a tire.

The socket 26 is attachable on the extension 17 of the shaft 15 by means of a cotter 27 projecting through parts 26 and 17 as shown in Figs. 1 and 2. The tool is resiliently connected with the socket by a spring 40.

A rotatable wheel-supporting stand is composed of a cylindrical housing 28 with a wide base plate; mounted in ball bearings within the housing is a drum 29 on the top side of which a disc or a spider 30 is seated to provide a rest for the wheel centre 31. The latter can be clamped in position with the aid of a nut 32 cooperating with a worm spindle 33. The latter is provided at its upper end with a pair of handles 34.

The housing 28 of the stand is provided with an extension 35 (see Fig. 1) which carries a fork 36 subjected to the adjustable pull of a spring 37 anchored to the cross brace 4 of the upright. The stand 29 is slidable on the horizontal plane surface 38.

The plant thus described is operated as follows:

With the wheel clamped on the rotatable stand the tool-holding cylinder is brought into position with the aid of the worm spindle 42 acting upon the cylinder-carrying beam 6, after which compressed air is let in to force the piston 11 downwards against the action of spring 13.

Thereafter, with the aid of the handle 23 the operator places the tool end 22 in a suitable position to be engaged between the rim flange and the tire bead, at a definite point on the periphery of the wheel (see Fig. 1), and admits then the fluid under pressure into the cylinder 10. The piston 11 wedges completely the tool end 22 between the rim flange and the tire bead, and unsticks thus the latter from the former, then forces away said tire bead from said rim flange (see Fig. 2) by the action of the convex side of the tool upon the tire bead. With the aid of the handles 34, the operator rotates the drum 29 and the wheel held by said drum, then effects the same operations as just described on different points of the wheel until the tire is completely disengaged from the wheel rim. During these operations, should the tool end 22 be forced against an excessive resistance, the assembly comprising the wheel, the tire and the wheel-supporting stand itself would then slide on the plane surface 38 against the resistance of the spring 37, the provision of which prevents thus any breakage of the tool.

Where large-size wheels are to be dealt with the stand is dragged away altogether and the wheel simply laid on the ground.

In a further preferred embodiment of the spade-like tool for use in stripping wheels from their tires said spoon-shaped portion of the tool is formed with a median web adapted in the course of its operation to engage the arm attached to the lower end of the said shaft. As shown in Figs. 4, 5 and 6, the tool 21, 22 is formed with a median web 41 received between the lower ends of the lugs 24.

Said web 41 is formed with a concave edge-portion 42 which rises from the tool face at some distance from the lower edge of the same and with a straight edge 43 adapted in the downward movement of the piston to engage the flat under side of the arm 25 carrying the socket 26. The tool is thus urged to rock forwards against the action of return springs 40 and thereby to pry the tire flange out of engagement with the wheel centre flange.

The fork-shaped tool shown in Figs. 7 to 9 is designed for use in removing even rusted rim flanges and locking rings as well as in fixing them back to the wheel.

Said tool includes an operating handle 44 clamped between a pair of jaws 45 which at their lower ends straddle a fork 46 formed with two or more prongs and rearwardly extending projections 47. These projections perform the function of levers when the prongs 46 find a fulcrum on the edge of the wheel centre rim.

The locking rings may also be removed with the aid of a flat iron bit 50 (Figs. 10 and 11) formed with a socket 51 to be fitted on and coaxial with the end of the piston rod. Said bit is bent out at its edge in spoon-like fashion as shown at 52.

It is to be understood that my invention is not limited to the embodiment described and shown and that various unimportant modifications may be made in the various features of the invention without departing from its scope.

Thus, my invention is not limited to the use of a compressed gas as the operating medium since the plant may as well be designed for hydraulic or any other kind of control. Likewise, it remains within the scope of the invention to replace the drum 29 by a disc with radially extending spokes provided with rollers running on the stand 28. The fork-like tool may be formed with three or more prongs instead of two as shown.

What I claim is:

A tire fitting and unfitting machine including an upright, a substantially horizontal beam slidably mounted on said upright for longitudinal displacement in relation thereto, a fluid operated piston-and-cylinder unit rigidly attached to said beam for substantially vertical and downwardly directed operation, a tool pivotally attached to the outer end of the movable part of said unit for swinging movement on a horizontal axis, a wheel-supporting stand adapted for holding a wheel in a substantially horizontal position below said tool and within reach thereof, said stand being capable of substantially horizontal displacement with regard to the upright, and a resilient connexion between said supporting stand and said upright, whereby an excessive stress obliquely exerted by the tool upon the wheel results in forcing the stand away from the upright against the action of said resilient means.

References Cited in the file of this patent

UNITED STATES PATENTS

| | | |
|---|---|---|
| 1,416,094 | Krauska | May 16, 1922 |
| 1,486,030 | Pence | Mar. 4, 1924 |
| 1,489,151 | Prossen | Apr. 1, 1924 |
| 1,716,882 | Freivogel | June 11, 1929 |
| 2,495,118 | McCollister | Jan. 17, 1950 |
| 2,528,362 | Hauta | Oct. 31, 1950 |
| 2,538,962 | Branick | Jan. 23, 1951 |
| 2,616,487 | Parks | Nov. 4, 1952 |